United States Patent [19]

Paschetto

[11] 3,863,117

[45] Jan. 28, 1975

[54] PLURAL MOTOR TENSIONING SYSTEM FOR REWINDING TAPE CASSETTES

[75] Inventor: Edward J. Paschetto, Little Silver, N.J.

[73] Assignee: Electronic Associates Inc., Long Branch, N.J.

[22] Filed: Apr. 9, 1973

[21] Appl. No.: 348,875

[52] U.S. Cl. ................ 318/7, 242/75.44, 242/75.51

[51] Int. Cl. ........................ B65h 59/38, H02p 5/46

[58] Field of Search ....... 318/7, 6; 242/75.44, 75.51

[56] References Cited

UNITED STATES PATENTS

| | | | |
|---|---|---|---|
| 3,512,733 | 5/1970 | Ault | 318/7 X |
| 3,704,401 | 11/1972 | Miller | 318/7 |
| 3,715,641 | 2/1973 | Mattes | 318/7 |

*Primary Examiner*—T. E. Lynch

[57] ABSTRACT

In a tape transport, a system for rewinding tape on the supply reel while maintaining tension on the tape being rewound. A substantially constant supply voltage is applied to the rewind motor for producing rewind current which varies directly with the rewind torque. A control circuit produces holdback current through the holdback motor of predetermined value which varies as an inverse function of the rewind current and is independent of holdback motor speed. In this manner, the holdback motor torque is forced to maintain tape tension.

2 Claims, 1 Drawing Figure

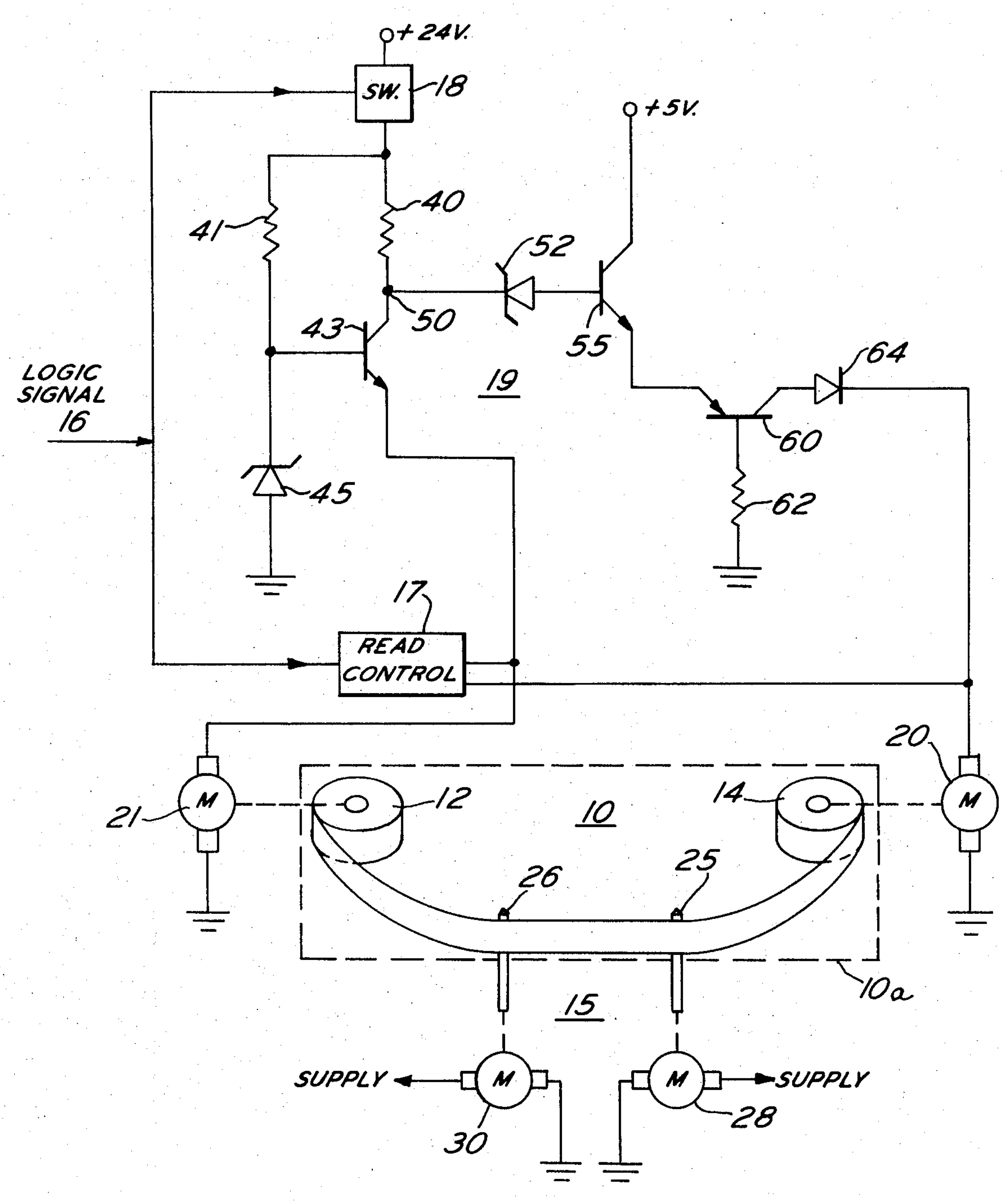
+24V.
SW.
18
+5V.
40
41
52
50
43
55
19
64
LOGIC SIGNAL 16
60
45
62
17
READ CONTROL
20
21
M
12
10
14
M
26
25
10a
15
SUPPLY
M
M
SUPPLY
30
28

PLURAL MOTOR TENSIONING SYSTEM FOR REWINDING TAPE CASSETTES

BACKGROUND OF THE INVENTION

A. Field of the Invention

This invention relates to the field of art of tape transports and particularly to rewinding tape cassettes.

B. Prior Art

In transport systems for cassette tapes, it has been a problem during rewind to control tape tension in order to obtain a good wrap of the tape around the reel. This problem has been solved in open reel tape machines since the tape is accessible and a separate arm can be used to sense the tape tension. The take up torque can then be controlled as a function of the sensing. However, in cassettes, the tape is not accessible since the tape runs in an enclosure. In an attempt to alleviate the problem, in some cassette tape drives it has been known to use digital encoders on the motors to sense speed. With that sensing of the motor speed, take-up torque has been controlled. However, these prior drives have left much to be desired since the encoder and related circuitry are relatively expensive.

SUMMARY OF THE INVENTION

In a tape transport, a system for rewinding the tape on a supply reel of a tape cassette in which tension is maintained on the tape being rewound. A rewind motor drives the supply reel and a holdback motor is driven in a plugging mode by the take-up reel. A substantially constant supply voltage is applied to the rewind motor during the entire rewind operation for producing a rewind current which varies as a function of the rewind torque. A control circuit applies a current through the holdback motor of predetermined value which is (1) an inverse function of the rewind current, and (2) independent of the holdback motor speed. In this manner the holdback motor torque is forced to maintain tension of the tape and to provide a good wrap of the tape around the supply reel.

BRIEF DESCRIPTION OF THE DRAWING

The drawing schematically illustrates a portion of a tape transport for a tape cassette and a system for rewinding the tape in accordance with the invention.

DESCRIPTION OF THE PREFERRED EMBODIMENTS

Referring now to the drawing there are shown portions of a digital tape transport system 15 for a tape cassette 10. Cassette 10 comprises a housing 10*a* enclosing tape 11 wound on and extending between a supply reel 12 and a tape-up reel 14. By convention, a tape cassette is supplied with the supply reel wound full of tape and take-up reel empty.

Tape transport system 15 may be a digital computer peripheral compatible with ANSI standards, such as an EAI CT Series Digital Cassette Tape Transport. It will be understood that system 15 may comprise other known types of tape transport systems. For digital operation in both read forward and read reverse, a logic signal 16 from system 15 (1) turns off switch 18 of rewind control circuit 19, and (2) actuates read control circuit 17. Control circuit 17 also part of system 15 is effective to control permanent magnet dc reel motors 20 and 21 in the following manner.

During read forward, reel motor 20 is controlled to provide a torque to take-up reel 14 which in turn applies take-up tension to tape 11 so that there is a proper wrap around reel 14. Reel motor 21 in read forward provides a small holdback torque to supply reel 12 which provides a holdback tension to tape 11. The tape is actually being pulled by forward capstan 26 which comprises the shaft of a capstan motor 28. As understood by those skilled in the art, a pinch roller (not shown) provides friction between tape 11 and capstan 25.

In read reverse operation, the function of motors 20, 21 are reversed with motor 21 providing the take-up tension and motor 20 providing the holdback tension. A reverse capstan 26 which comprises the shaft of capstan motor 30 is provided with an additional pinch roller (not shown) to drive tape 11 in the read reverse operation.

After the read operation has been completed, it is then necessary to rewind the tape on supply reel 12 so that it is full and take-up reel 14 is empty. Accordingly, motor 21 operates as a rewind motor for reel 12 while motor 20 operates as a holdback motor for reel 14. For purposes of the following description of the rewind operation, motor 21 will be called the rewind motor and motor 20 the holdback motor.

To decrease the time of the rewind, relatively high speeds are used and as well known, the heads (not shown) are disengaged to save wear both on tape 11 and on the heads. In addition, capstans 25 and 26 are not used since they are used only for low speed read operation. Accordingly, only motors 20 and 21 are operational.

During rewind, logic signal 16 is effective to turn off read control circuit 17 and to turn on rewind switch 18. Rewind switch 18 is connected between a source of positive potential and the junction of resistors 40, 41. The other side of resistor 40 is connected to junction 50 and the collector of an NPN transistor 43. The base of transistor 43 is connected by way of the cathode of a Zener diode 45, the anode thereof to ground. The emitter of the transistor is connected to the armature of dc rewind motor 21. With Zener diode 45 connected between the base of transistor 43 and ground, it will be understood that a substantially constant potential is produced at the emitter with respect to ground for a substantially constant voltage across motor 21.

At the start of rewind supply reel 12 may be completely empty and take-up reel 14 completely full thus reel 12 is required to revolve at a relatively high speed to achieve a substantially constant tape speed as compared to the supply reel 12 becoming completely full. The foregoing ratios of speed at the start and end of rewind from an empty to a full supply reel 12 may be approximately 2 to 1. In addition, as supply reel 12 fills up, torque must be increased in order to maintain tape tension. Accordingly, motor 21 is selected so that upon application of a constant voltage, as speed decreases torque increases over a desired characteristic curve. It will be understood that during rewind, it is necessary that the tape speed as well as tape tension be maintained substantially constant for a good wrap of the tape 11 around reel 12.

In order to provide that tape tension, a holdback torque is provided by motor 20. Since motor 20 is being driven by the tape rotating reel 14 (rather than operating as a driving motor), motor 20 operates in a "plugging" mode. During rewind, with reel 14 full, the speed of reel 14 is at a minimum and the holdback torque is desired to be at a maximum. As reel 14 empties, the speed of reel 14 increased and it is desired that the holdback torque decrease. While this desired speed versus torque characteristic of motor 20 is exactly the same as the desired characteristic of motor 21, it will be understood that motor 20 is being driven backwards in a plugging mode. Therefore motor 20 would provide the reverse of the desired characteristic if a constant potential were applied across it.

Accordingly, the desired torque characteristic for motor 20 is provided by rewind control circuit 19 in the following manner. Junction 50 is connected by way of a Zener diode 52 to the base of an NPN transistor 55, the collector of which is connected to a positive potential supply. The emitter of transistor 55 is connected to the emitter of a PNP transistor 60 connected in its common base configuration; with the base thereof connected by way of a bias resistor 62 to ground. The collector of PNP transistor 60 is coupled by way of a blocking diode 64 to the armature of motor 20.

It will be understood that with respect to motors 20 and 21, as current increases torque also increases so that torque is equal to a constant times current. Therefore at the start of rewind it is desired to have a substantially high holdback current applied to motor 20 and that current to decrease to a minimum at the end of the rewind. To produce this current variation, circuit 19 is controlled by the potential at junction 50 which varies from a maximum at the start of rewind to a minimum at the end of the rewind. This voltage variation results from the changes in rewind motor current acting through resistor 40.

Zener diode 52 operates as a level converter or level changer and so that with a maximum value positive potential at junction 50 (for a minimum rewind motor current causing minimum potential drop across resistor 40) transistor 55 is biased to its maximum conductive state. With transistor 55 operating as a current amplifier, maximum drive current is applied to the emitter of transistor 60. Transistor 60 provides a predetermined value ("constant") current to motor 20 which does not vary regardless of the speed of motor 20. The value of that constant current is determined by the control voltage at junction 50. Therefore, a maximum predetermined current is applied to motor 20, for maximum holdback torque, when junction 50 is at its maximum positive potential regardless of the speed of motor 20 and even though the motor is operating in its pluggind mode. For increased rewind motor current, the potential at junction 50 decreases and the value of the predetermined current decreases for decreased holdback torque of motor 20. Thus there is achieved a desired torque from holdback motor 20 in relation to (an inverse function of) the torque of rewind motor 21. In this manner the holdback current and torque are controlled by the potential at junction 50 which is an inverse function of the rewind current and torque. More particularly, the torque of holdback motor 20 is forced in the above described manner to maintain proper tension on tape 11.

The above relationships of torque, current and speed of motors 21 and 22 at the start and end of rewind are set forth in the following table.

TABLE

| | Rewind Operation | | | | | | | | |
|---|---|---|---|---|---|---|---|---|---|
| | Rewind Motor 21 | | | | | Holdback Motor 20 | | | |
| | Rewind Torque | Rewind Current | Voltage at 50 | Speed | Supply Reel 12 | Holdback Torque | Holdback Current | Speed | Take-up Reel |
| START | Min | Min | Max | Max | Empty | Max | Max | Min | Full |
| END | Max | Max | Min | Min | Full | Min | Min | Max | Empty |

55 — current amplifier
60 — common base

It will be understood that different cassettes provide different internal friction which would affect different rewind tension and speed. It is desirable to keep the tape speed substantially constant. For example, if a cassette provides substantially low friction then it will be understood that the current through rewind motor 21 is further decreased than that indicated in the Table. With a further decreased current, the potential at junction 50 is increased thereby increasing the holdback current through motor 20 increasing its torque. This increased holdback torque compensates for the decreased friction of the cassette thereby to bring the speed and tension back to desired values.

What is claimed is:

1. In a tape transport for a tape cassette having a supply reel and a take-up reel, a system for rewinding the tape on the supply reel while maintaining tension on the tape being rewound to provide a good wrap of the tape around the supply reel comprising a rewind motor having characteristic torque and speed outputs for different supply voltages applied thereto for driving said supply, a holdback motor having characteristic torque and speed outputs for different supply voltages applied thereto, said motor being driven in a plugging mode by said take-up reel, means for applying a substantially constant supply voltage to said rewind motor during the entire rewind duration for producing the desired speed and torque output from the motor, and control means connected to said supply voltage means and to said rewind motor for applying a current of predetermined value through said holdback motor to operate said motor in the plugging mode which predetermined value (1) is an inverse function of said rewind motor current and (2) independent of the holdback motor speed thereby forcing the holdback motor torque to maintain proper tension on said tape, said rewind motor current varying in value as a direct function of the value of said rewind motor torque and said supply voltage means including means responsive to said rewind motor current for producing at a junction a control voltage which varies in value as an inverse function of the value of said rewind motor current, said control means including a first transistor connected in its common base configuration, current ampilifier means connected between an emitter of said first transistor and said control voltage junction for producing said predetermined value holdback motor current which remains constant at any one value control voltage independent of said holdback motor speed and voltage, and, said current amplifier comprising a second transistor the emitter of which is connected to said emitter of said first transistor, and a Zener diode operating as a level converter connected between the base of said second transistor and said control voltage junction.

2. In a tape transport, the system according to claim 1 in which said supply voltage means includes a third transistor having an emitter connected to said rewind motor, and a collector connected to said control voltage junction, a second Zener diode connected between a base of said second transistor and a source of reference potential for producing said substantially constant supply voltage there between.

* * * * *